United States Patent
Kang et al.

(10) Patent No.: US 9,967,013 B2
(45) Date of Patent: May 8, 2018

(54) FEEDBACK REPORTING METHOD FOR MASSIVE ANTENNA ARRAY BASED BEAMFORMING IN WIRELESS COMMUNICATION SYSTEM, AND APPARATUS THEREFOR

(71) Applicant: LG ELECTRONICS INC., Seoul (KR)

(72) Inventors: Jiwon Kang, Seoul (KR); Kilbom Lee, Seoul (KR); Kitae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/115,647

(22) PCT Filed: Jun. 24, 2014

(86) PCT No.: PCT/KR2014/005560
§ 371 (c)(1),
(2) Date: Jul. 29, 2016

(87) PCT Pub. No.: WO2015/115705
PCT Pub. Date: Aug. 6, 2015

(65) Prior Publication Data
US 2017/0163325 A1    Jun. 8, 2017

Related U.S. Application Data

(60) Provisional application No. 61/932,782, filed on Jan. 29, 2014.

(51) Int. Cl.
*H04W 4/00* (2018.01)
*H04B 7/06* (2006.01)
(Continued)

(52) U.S. Cl.
CPC ........ *H04B 7/0617* (2013.01); *H04B 7/0619* (2013.01); *H04L 5/0048* (2013.01);
(Continued)

(58) Field of Classification Search
CPC .................................................... H04B 7/0617
See application file for complete search history.

(56) References Cited

U.S. PATENT DOCUMENTS 6,510,173 B1 *    1/2003    Garmonov ............ H04L 1/0071
                                                              375/141
2013/0034177 A1    2/2013    Lee et al.
(Continued)

FOREIGN PATENT DOCUMENTS

EP    2169846    3/2010
EP    2555445    2/2013
(Continued)

OTHER PUBLICATIONS

PCT International Application No. PCT/KR2014/005560, Written Opinion of the International Searching Authority dated Oct. 27, 2014, 10 pages.
European Patent Office Application Serial No. 14881139.1, Search Report dated Aug. 21, 2017, 11 pages.

*Primary Examiner* — Gerald Smarth
(74) *Attorney, Agent, or Firm* — Lee Hong Degerman Kang & Waimey

(57) ABSTRACT

A method for transmitting feedback information to a base station by a user equipment, for massive antenna array based beamforming in a wireless communication system is disclosed. The method includes receiving information about a plurality of pilot patterns for a massive antenna array from the base station, estimating a plurality of channels corresponding to the plurality of pilot patterns by receiving a pilot signal based on the plurality of pilot patterns, and transmitting the feedback information for the plurality of channels to
(Continued)

the base station, wherein the feedback information includes information about whether closed-loop beamforming or open-loop beamforming is applied to the plurality of channels and information about an effective antenna array for the plurality of channels.

8 Claims, 16 Drawing Sheets

(51) Int. Cl.
  *H04L 5/00*   (2006.01)
  *H04L 25/02*   (2006.01)
  *H04W 72/02*   (2009.01)
  *H04W 88/08*   (2009.01)
  *H04W 88/02*   (2009.01)

(52) U.S. Cl.
  CPC ......... *H04L 25/0202* (2013.01); *H04W 72/02* (2013.01); *H04W 88/02* (2013.01); *H04W 88/08* (2013.01)

(56) References Cited

U.S. PATENT DOCUMENTS

| | | |
|---|---|---|
| 2013/0294421 A1 | 11/2013 | Au et al. |
| 2013/0295944 A1 | 11/2013 | Saur et al. |
| 2013/0329664 A1 | 12/2013 | Kim et al. |
| 2014/0307641 A1* | 10/2014 | Shen ................ H04L 1/206 370/329 |
| 2015/0092876 A1* | 4/2015 | Park ................ H04B 7/026 375/267 |
| 2016/0173183 A1* | 6/2016 | Kang ................ H01Q 3/06 455/562.1 |
| 2017/0163325 A1* | 6/2017 | Kang ................ H04B 7/0617 |

FOREIGN PATENT DOCUMENTS

| | | |
|---|---|---|
| EP | 2993804 | 3/2016 |
| EP | 3028388 | 6/2016 |
| WO | 2013173679 | 11/2013 |
| WO | 2015016489 | 2/2015 |

* cited by examiner

FIG. 2
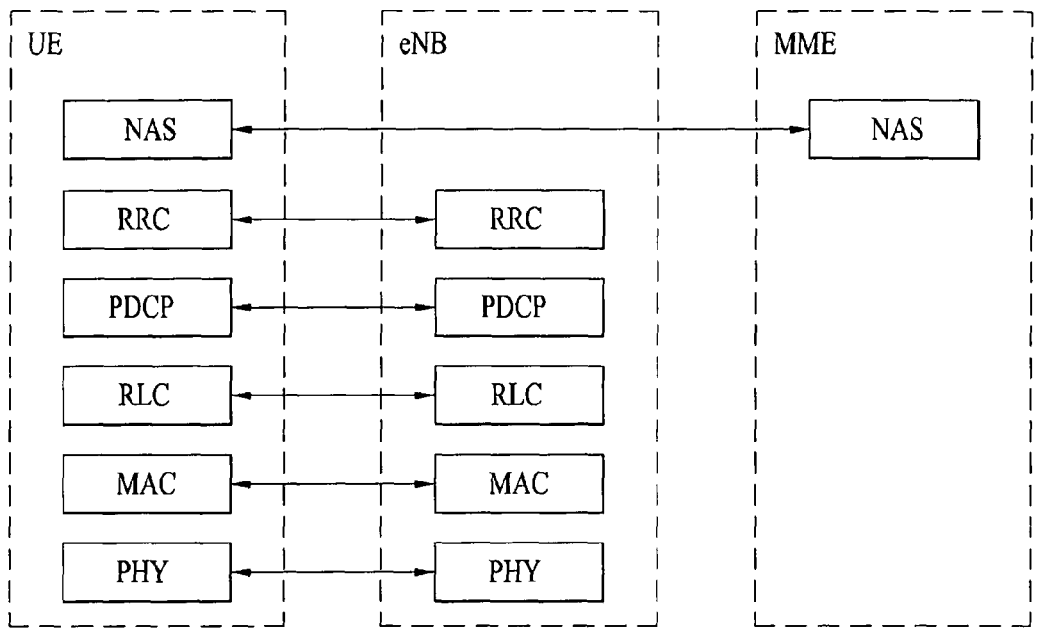
(A) CONTROL-PLANE PROTOCOL STACK
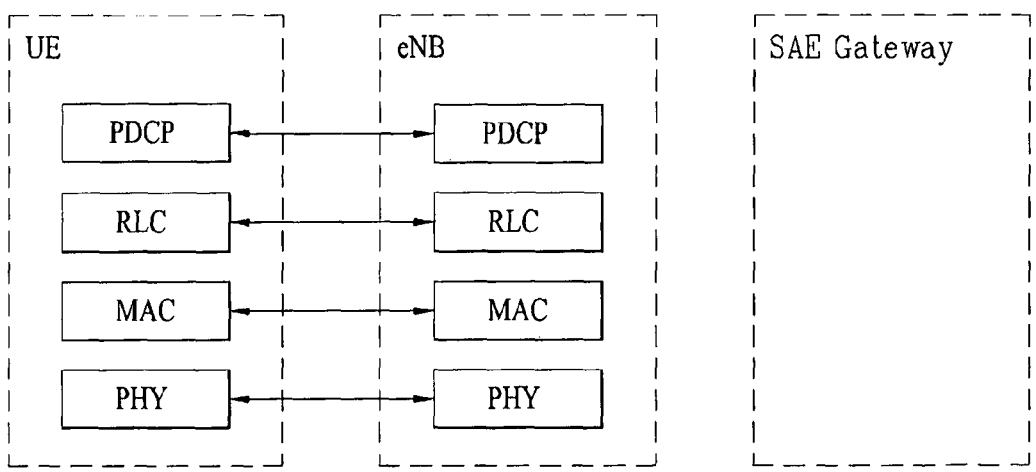
(B) USER-PLANE PROTOCOL STACK

▨ : DMRS GROUP 1

▩ : DMRS GROUP 2

(a) CONVENTIONAL ANTENNA SYSTEM    (b) AAS

CSI-RS resource 1 for Partition 1

CSI-RS resource 2 for Partition 2

CSI-RS resource Nt_v for Partition Nt_v

Linking coeff

CSI-RS resource 1 for Partition 1

CSI-RS resource 2 for linking coeff

FEEDBACK REPORTING METHOD FOR MASSIVE ANTENNA ARRAY BASED BEAMFORMING IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2014/005560, filed on Jun. 24, 2014, which claims the benefit of U.S. Provisional Application No. 61/932,782, filed on Jan. 29, 2014, the contents of which are all hereby incorporated by reference herein in their entirety.

TECHNICAL FIELD

The present invention relates to a wireless communication system and, more particularly, to a feedback reporting method for massive antenna array based beamforming in a wireless communication system, and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

An object of the present invention devised to solve the problem lies in providing a feedback reporting method for massive antenna array based beamforming in a wireless communication system, and an apparatus therefore.

Technical Solution

In accordance with an aspect of the present invention, a method for transmitting feedback information to a base station by a user equipment, for massive antenna array based beamforming in a wireless communication system includes receiving information about a plurality of pilot patterns for a massive antenna array from the base station; estimating a plurality of channels corresponding to the plurality of pilot patterns by receiving a pilot signal based on the plurality of pilot patterns; and transmitting the feedback information for the plurality of channels to the base station, wherein the feedback information includes information about whether closed-loop beamforming or open-loop beamforming is applied to the plurality of channels and information about an effective antenna array for the plurality of channels.

In accordance with another aspect of the present invention, a method for transmitting a signal to a user equipment by a base station, using massive antenna array based beamforming in a wireless communication system includes transmitting information about a plurality of pilot patterns for a massive antenna array to the user equipment; transmitting a pilot signal based on the plurality of pilot patterns; receiving feedback information from the user equipment; and transmitting the signal to the user equipment through a plurality of channels corresponding to the plurality of pilot patterns, wherein the feedback information includes information about whether closed-loop beamforming or open-loop beamforming is applied to the plurality of channels and information about an effective antenna array for the plurality of channels.

The pilot patterns may include first pilot patterns for defining one of a horizontal region and a vertical region of the massive antenna array and a second pilot pattern for linking the first pilot patterns. The channels may include first channels corresponding to the first pilot patterns and a second channel corresponding to the second pilot pattern.

When the number of antenna ports included in the effective antenna array is 0, open-loop beamforming may be applied to an associated channel.

The information about the effective antenna array may be information for adapting beamwidth of an associated channel. The information about the effective antenna array may include information about the number of antenna ports included in the effective antenna array and the number of antenna ports may be reduced as relative mobility of the user equipment increases.

Advantageous Effects

According to the embodiments of the present invention, in a wireless communication system, a user equipment can efficiently report feedback for beamforming using a massive antenna array and an eNB can efficiently perform beamforming using the massive antenna array based on feedback reporting.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram illustrating structures of a control plane and a user plane of a radio interface protocol between a UE and an E-UTRAN based on the 3GPP radio access network specification.

BEST MODE

Figure 1:
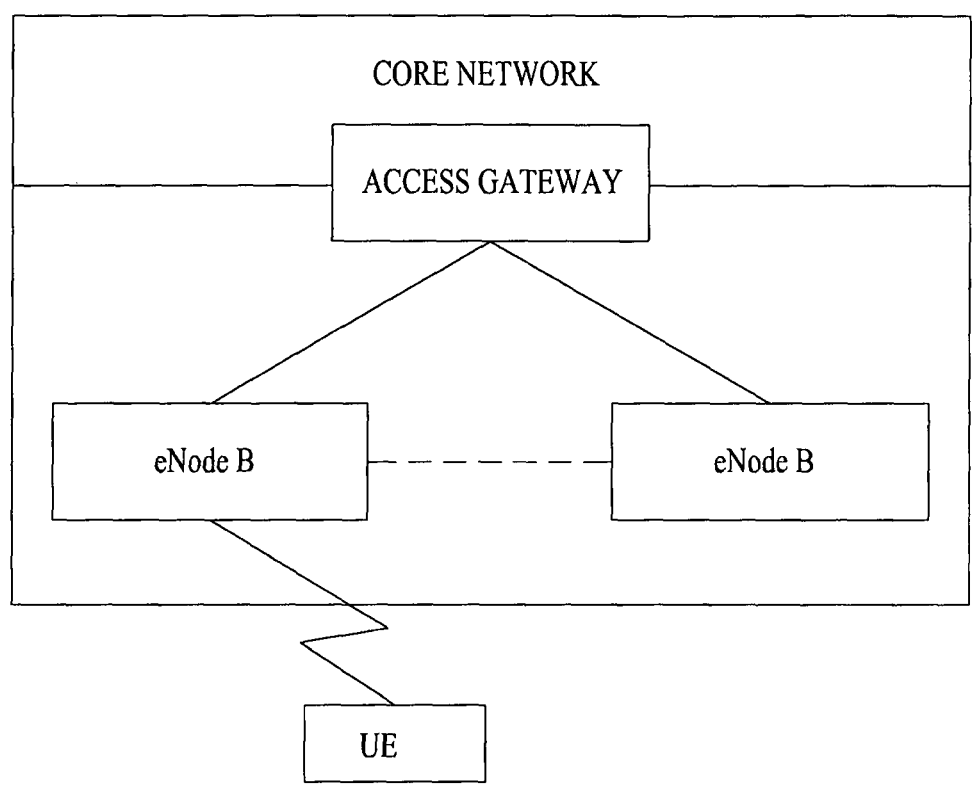
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
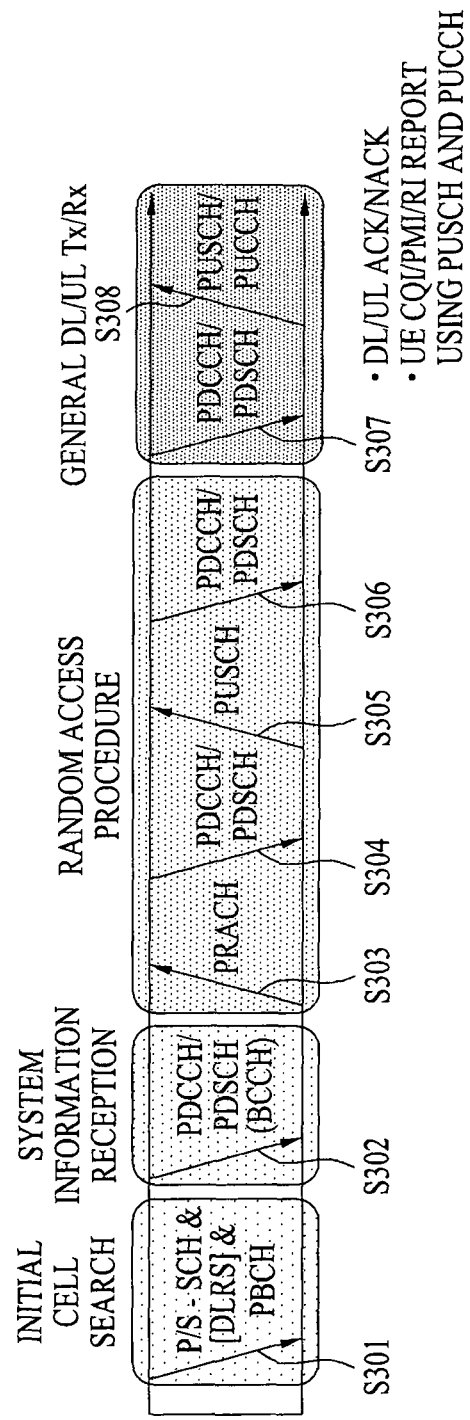
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
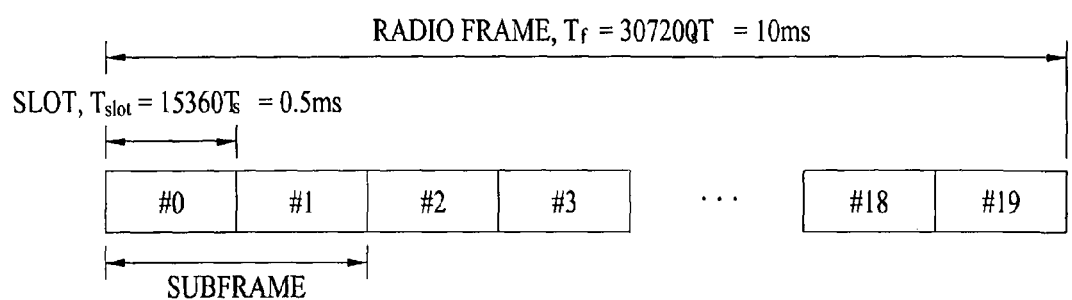
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
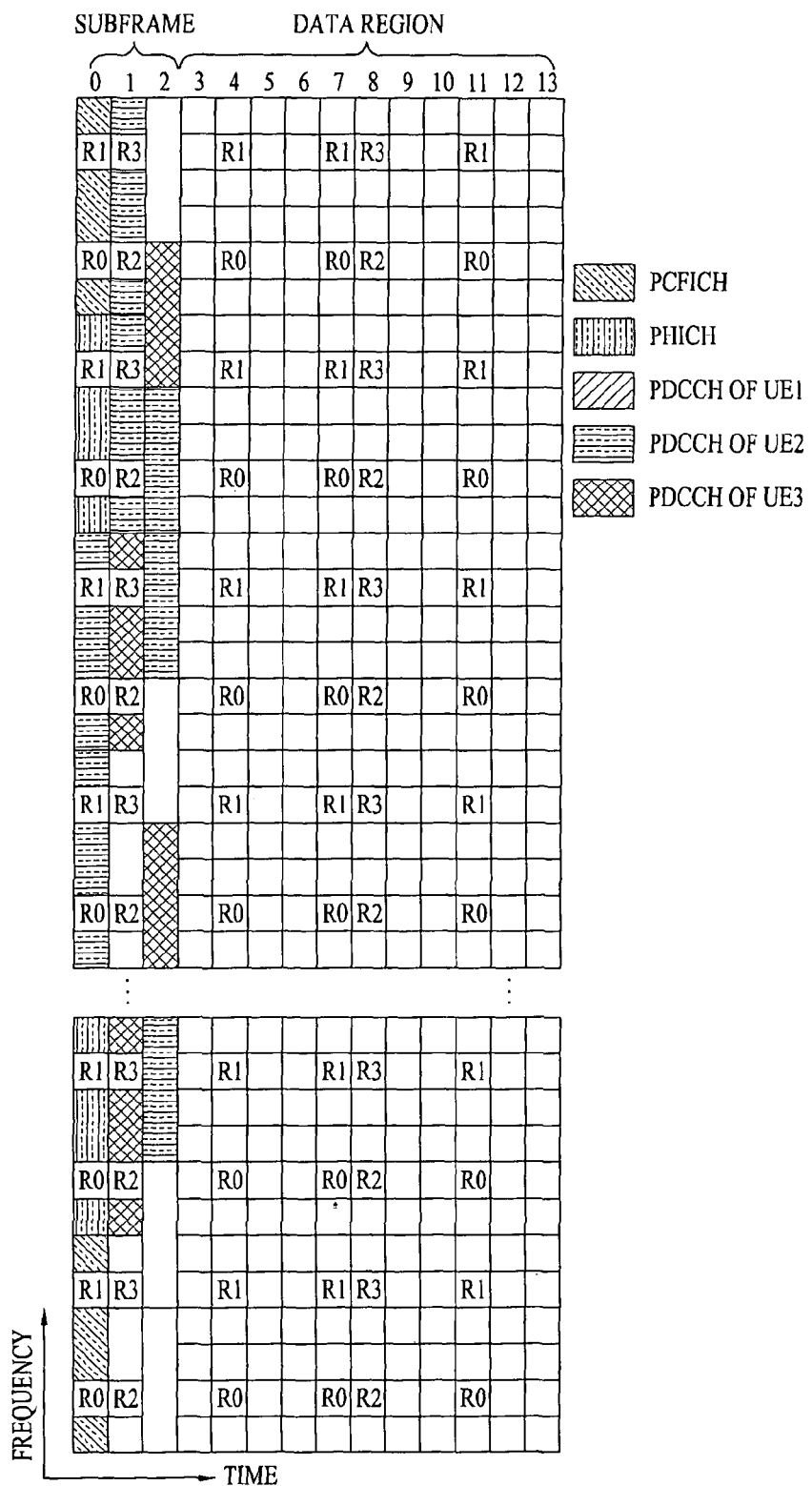
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
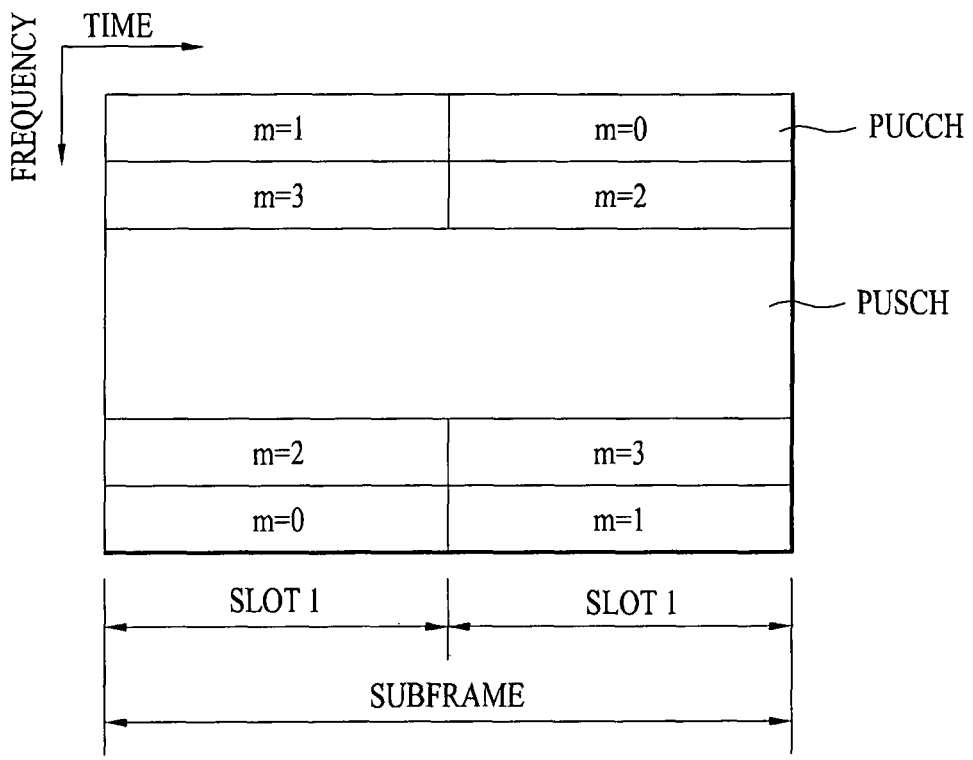
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
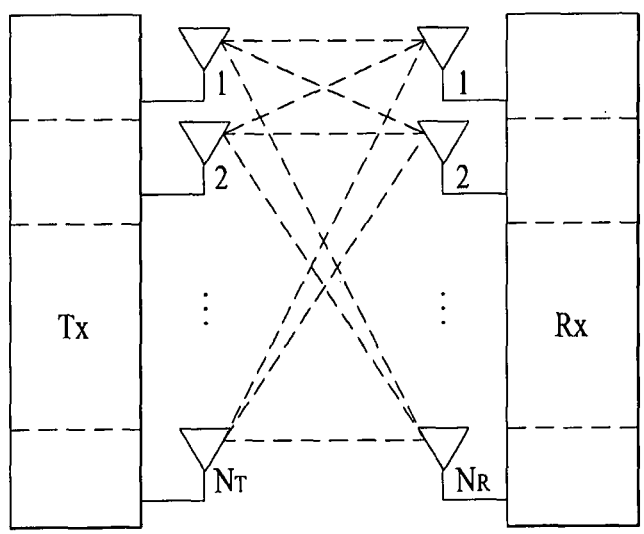
FIG. 7 is a diagram illustrating a configuration of a general MIMO communication system.

FIG. 7 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, $N_T$ transmission signals $x_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix}$$ [Equation 5]

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \le \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \le \text{rank}(H) \le \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the next-generation mobile communication standard, LTE-A, will support coordinated multi-point (CoMP) transmission in order to increase data transmission rate, compared to the legacy LTE standard. CoMP refers to transmission of data to a UE through cooperation among two or more eNBs or cells in order to increase communication performance between a UE located in a shadow area and an eNB (a cell or sector).

CoMP transmission schemes may be classified into CoMP-Joint processing (CoMP-JP) called cooperative MIMO characterized by data sharing, and CoMP-coordinated scheduling/beamforming (CoMP-CS/CB).

In DL CoMP-JP, a UE may instantaneously receive data simultaneously from eNBs that perform CoMP transmission and may combine the received signals, thereby increasing reception performance (joint transmission (JT)). In addition, one of the eNBs participating in the CoMP transmission may transmit data to the UE at a specific time point (dynamic point selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (joint reception (JR)). In contrast, in UL CoMP-CS/CB, only one eNB receives a PUSCH from a UE. Here, cooperative cells (or eNBs) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wide-band PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\,W2) \quad \text{[Equation 8]}$$

In Equation 8, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix},$$ [Equation 9]

where $X_i$ is $Nt/2$ by $M$ matrix.

$$W2(j) = \begin{bmatrix} \overbrace{e_M^k \quad e_M^l \quad \cdots \quad e_M^m}^{r \text{ columns}} \\ \alpha_j e_M^k \quad \beta_j e_M^l \quad \cdots \quad \gamma_j e_M^m \end{bmatrix} \text{ (if rank = } r\text{)},$$

where $1 \le k, l, m \le M$ and $k, l, m$ are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i) * W2(j) = \begin{bmatrix} X_i(k) \\ \alpha_j X_i(k) \end{bmatrix}$$ [Equation 10]

In Equation 10, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

Hereinbelow, transmission modes for a DL data channel will be described. A current 3GPP LTE standard specification, 3GPP TS 36.213, defines DL data channel transmission modes as illustrated in Table 1. A DL data channel transmission mode is indicated to a UE by higher-layer signaling, that is, RRC signaling.

TABLE 1

| Transmission mode | DCI format | Transmission scheme of PDSCH corresponding to PDCCH |
| --- | --- | --- |
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |

TABLE 1-continued

| Transmission mode | DCI format | Transmission scheme of PDSCH corresponding to PDCCH |
| --- | --- | --- |
| Mode 3 | DCI format 1A | Transmit diversity |
|  | DCI format 2A | Large delay CDD or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user MIMO |
| Mode 6 | DCI format 1A | Transmit diversity |
|  | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
|  | DCI format 1 | Single-antenna port, port 5 |
| Mode 8 | DCI format 1A | If the number of PBCH antenna ports is one, Single-antenna port, port 0 is used, otherwise Transmit diversity |
|  | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2D | Up to 8 layer transmission, ports 7-14 or single-antenna port, port 7 or 8 |

Referring to Table 1, the current 3GPP LTE standard specification defines transmission modes and DCI formats corresponding to the transmission modes. DCI format 1A is additionally defined for application irrespective of transmission modes, that is, for a fallback mode. As an example of operation regarding transmission modes, if DCI format 1B is detected as a result of blind-decoding a PDCCH in Table 1, a PDSCH is decoded under the assumption that the PDSCH is transmitted by closed-loop multiplexing using a single layer.

In Table 1, transmission mode 10 represents a DL data channel transmission mode of the above-described CoMP transmission scheme. For example, if DCI format 2D is detected as a result of a UE blind-decoding the PDCCH, the PDSCH is decoded under the assumption that the PDSCH has been transmitted by a multi-antenna transmission scheme through antenna port 7 to antenna port 14, that is, based on demodulation RSs (DM-RSs). Alternatively, the UE decodes the PDSCH assuming that the PDSCH has been transmitted by a single-antenna transmission scheme based on DM-RS antenna port 7 or DM-RS antenna port 8.

On the other hand, if DCI format 1A is detected as a result of blind-decoding the PDCCH, a transmission mode differs according to whether an associated subframe is an MBSFN subframe. For example, the associated subframe is a non-MBSFN subframe, the UE decodes the PDSCH assuming that the PDSCH has been transmitted by a single-antenna transmission scheme based on CRS of antenna port 0 or by a CRS based transmit diversity scheme. If the associated subframe is an MBSFN subframe, the UE decodes the PDSCH assuming that the PDSCH has been transmitted by a single-antenna transmission scheme based on DM-RS of antenna port 7.

Now a detailed description of an RS will be given.

In general, a transmitter transmits an RS known to both the transmitter and a receiver to the receiver along with data so that the receiver may perform channel measurement in the RS. The RS serves to perform demodulation by indicating a modulation scheme as well as channel measurement. The RS is classified into a dedicated RS (DRS) for a specific UE and a common RS (or cell-specific RS (CRS)) for all UEs within a cell. The CRS includes an RS used by a UE to measure a CQI/PMI/RI to be reported to an eNB. This RS is referred to as a channel state information-RS (CSI-RS).

Figure 8:
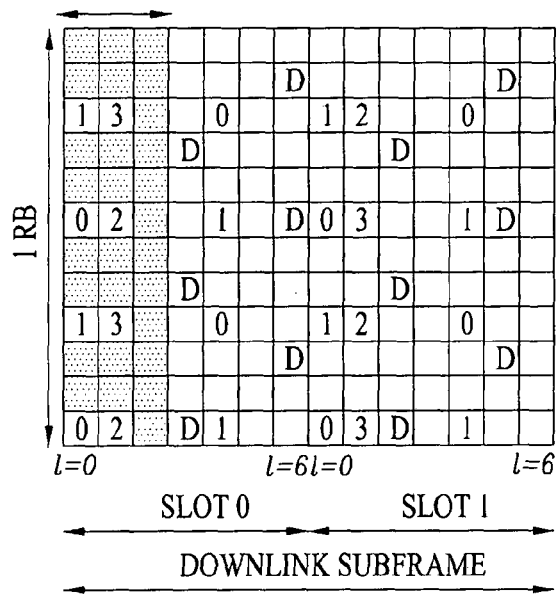
FIGS. 8 and 9 are diagrams illustrating DL RS configurations in an LTE system supporting DL transmission through four antennas.
Figure 9:
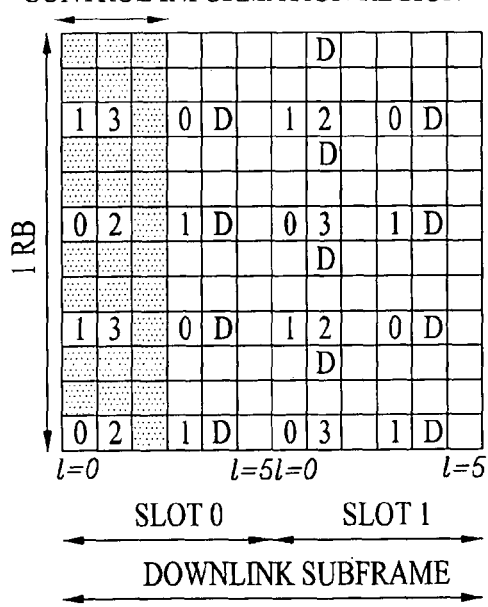

FIGS. 8 and 9 illustrate RS configurations in an LTE system supporting DL transmission through four antennas. Specifically, FIG. 8 illustrates an RS configuration in the case of a normal CP and FIG. 9 illustrates an RS configuration in the case of an extended CP.

Referring to FIGS. 8 and 9, reference numerals 0 to 3 indicated in grids denote cell-specific RSs, CRSs, transmitted through antenna port 0 to antenna port 3, for channel measurement and data modulation. The CRSs may be transmitted to UEs across a control information region as well as a data information region.

Reference character D indicated in grids denotes a UE-specific RS, i.e. a DM-RS. M-RSs are transmitted in a data region, that is, on a PDSCH, to support single-antenna port transmission. The existence/absence of a UE-specific RS, DM-RS, is indicated to a UE by higher-layer signaling. In FIGS. 8 and 9, the DM-RSs are transmitted through antenna port 5. 3GPP TS 36.211 defines DM-RSs for a total of eight antenna ports, antenna port 7 to antenna port 14.

Figure 10:
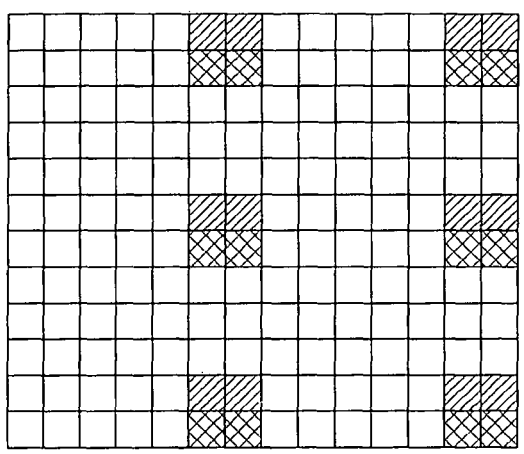
FIG. 10 illustrates exemplary DL DM-RS allocation defined in a current 3GPP standard specification.

FIG. 10 illustrates exemplary DL DM-RS allocation defined in a current 3GPP standard specification.

Referring to FIG. 10, DM-RSs for antenna ports 7, 8, 11, and 13 are mapped using sequences for the respective antenna ports in DM-RS group 1, whereas DM-RSs for antenna ports 9, 10, 12, and 14 are mapped using sequences for the respective antenna ports in DM-RS group 2.

As compared to CRS, CSI-RS was proposed for channel measurement of a PDSCH and up to 32 different resource configurations are available for CSI-RS to reduce inter-cell interference (ICI) in a multi-cell environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. Table 2 and Table 3 list CSI-RS configurations defined in the 3GPP standard. Specifically, Table 2 lists CSI-RS configurations in the case of a normal CP and Table 3 lists CSI-RS configurations in the case of an extended CP.

TABLE 2

| | | Number of CSI reference signals configured | | | | | |
|---|---|---|---|---|---|---|---|
| | CSI reference signal configuration | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |

TABLE 2-continued

| | | Number of CSI reference signals configured | | | | | |
|---|---|---|---|---|---|---|---|
| | CSI reference signal configuration | 1 or 2 | | 4 | | 8 | |
| | | (k', l') | $n_s$ mod 2 | (k', l') | $n_s$ mod 2 | (k', l') | $n_s$ mod 2 |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| | | Number of CSI reference signals configured | | | | | |
|---|---|---|---|---|---|---|---|
| | CSI reference signal configuration | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
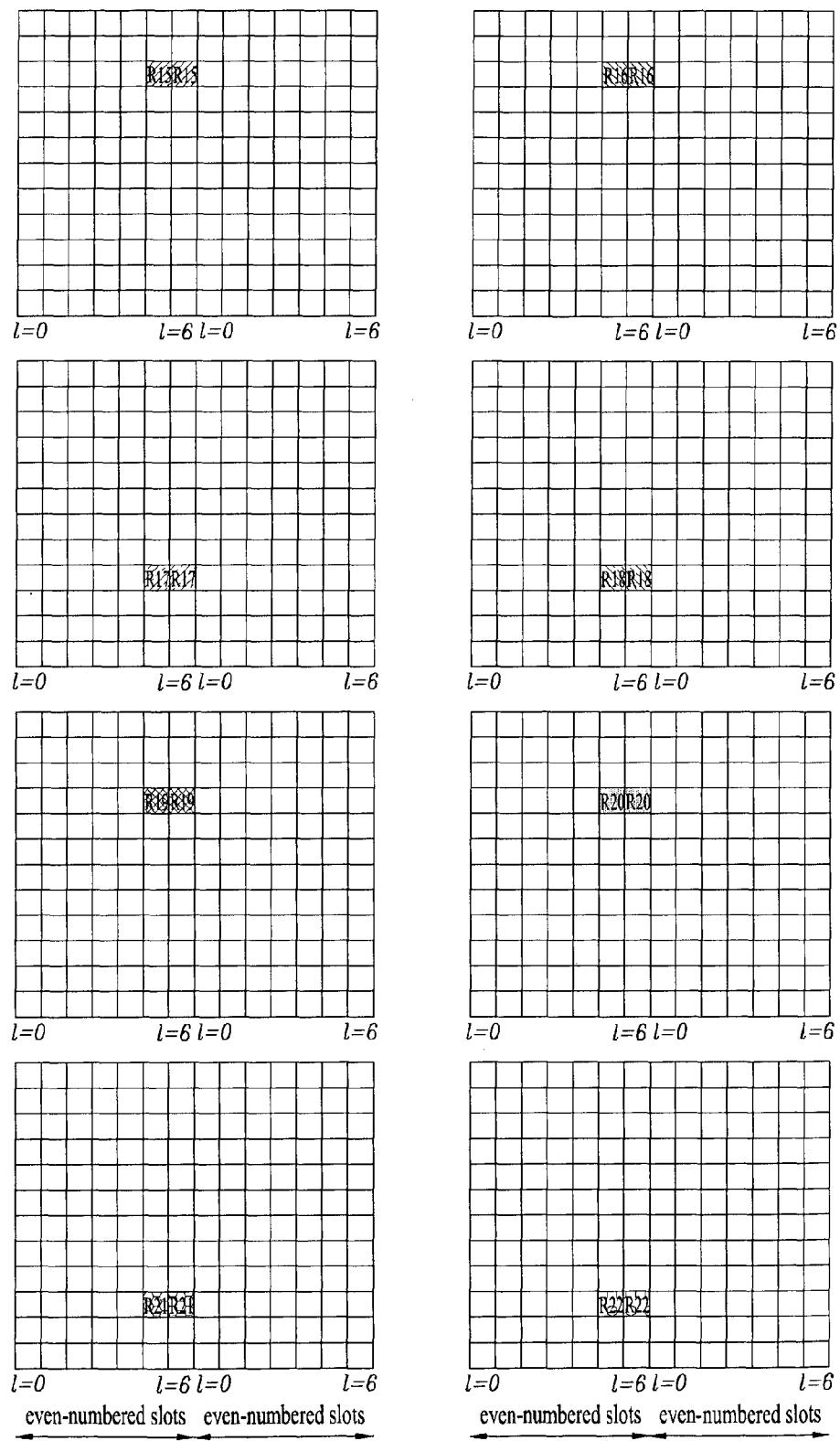
FIG. 11 illustrates CSI-RS configuration #0 of DL CSI-RS configurations defined in the current 3GPP standard.

In Table 2 and Table 3, (k',l') represents an RE index where k' is a subcarrier index and l' is an OFDM symbol index. FIG. 11 illustrates CSI-RS configuration #0 of DL CSI-RS configurations defined in the current 3GPP standard.

In addition, a CSI-RS subframe configuration may be defined by a periodicity in subframes, $T_{CSI-RS}$, and a subframe offset $\Delta_{CSI-RS}$. Table 4 lists CSI-RS subframe configurations defined in the 3GPP standard.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Meanwhile, information about a zero power (ZP) CSI-RS is configured through an RRC layer signal. Particularly, a ZP CSI-RS resource configuration includes zeroTxPowerSubframeConfig and zeroTxPowerResourceConfigList of a 16-bit bitmap. zeroTxPowerSubframeConfig indicates a CS-RS transmission periodicity and subframe offset of a ZP CSI-RS by $I_{CSI-RS}$ illustrated in Table 4. zeroTxPowerResourceConfigList indicates a ZP CSI-RS configuration. The elements of this bitmap indicate the respective configurations included in the columns for four CSI-RS antenna ports in Table 2 or Table 3. A normal CSI-RS other than ZP CSI-RS is referred to as non zero-power (NZP) CSI-RS.

When the above-described CoMP scheme is applied, a plurality of CSI-RS configurations may be signaled to the UE through an RRC layer signal. The CSI-RS configurations are defined as listed in Table 5. Referring to Table 5, it may be appreciated that information about CRS capable of assuming quasi co-location (QCL) is included in each CSI-RS configuration.

to the antenna port). The large-scale properties may include Doppler spread and Doppler shift which are associated with a frequency offset, average delay and delay spread which are associated with a timing offset, and average gain.

According to the definition of QCL, the UE may not assume that antenna ports that are not quasi co-located with each other have the same large-scale properties. Therefore, the UE should independently perform a tracking procedure in order to obtain the frequency offset and timing offset of each antenna port.

Meanwhile, the UE may perform the following operations regarding quasi co-located antenna ports.

1) The UE may identically apply estimated results of a power-delay profile of a radio channel corresponding to a specific antenna port, delay spread, Doppler spectrum, and Doppler spread to Wiener filter parameters used in channel estimation of a radio channel corresponding another antenna port.

2) The UE may acquire time synchronization and frequency synchronization of the specific antenna port and apply the same synchronization to another antenna port.

3) Finally, the UE may calculate the average of reference signal received power (RSRP) measurements of the quasi co-located antenna ports as an average gain.

For example, it is assumed that upon receipt of scheduling information of a DM-RS based DL data channel, e.g. DCI format 2C, through a PDCCH (or an enhanced PDCCH (E-PDCCH)), the UE performs channel estimation on a PDSCH using a DM-RS sequence indicated by the scheduling information and then demodulates data.

In this case, if a DM-RS antenna port for DL data channel demodulation is quasi co-located with a CRS antenna port of a serving cell, the UE may apply large-scale properties of a radio channel, which have been estimated from the CRS

TABLE 5

```
CSI-RS-ConfigNZP information elements

-- ASN1START
CSI-RS-ConfigNZP-r11 ::=            SEQUENCE {
    csi-RS-ConfigNZPId-r11              CSI-RS-ConfigNZPId-r11,
    antennaPortsCount-r11               ENUMERATED {an1, an2, an4, an8},
    resourceConfig-r11                  INTEGER (0..31),
    subframeConfig-r11                  INTEGER (0..154),
    scramblingIdentity-r11              INTEGER (0..503),
    qcl-CRS-Info-r11                    SEQUENCE {
        qcl-ScramblingIdentity-r11          INTEGER (0..503),
        crs-PortsCount-r11                  ENUMERATED {n1, n2, n4, spare1},
        mbsfn-SubframeConfigList-r11        CHOICE {
            release                             NULL,
            setup                               SEQUENCE {
                subframeConfigList                  MBSFN-SubframeConfigList
            }
        }                                                           OPTIONAL    -- Need ON
    }                                                               OPTIONAL,   -- Need OR
    ...
}
-- ASN1STOP
```

Now a description will be given of QCL between antenna ports.

If one antenna port is quasi co-located with another antenna port, this means that a UE may assume that the large-scale properties of a signal received from one antenna port (or a radio channel corresponding to the antenna port) are wholly or partially identical to those of a signal received from another antenna port (or a radio channel corresponding antenna port thereof, to channel estimation through the DM-RS antenna port, thereby improving the reception performance of the DM-RS based DL data channel.

Similarly, if the DM-RS antenna port for DL data channel demodulation is quasi co-located with the CSI-RS antenna port of the serving cell, the UE may apply large-scale properties of a radio channel, which have been estimated from the CSI-RS antenna port of the serving cell, to channel estimation through the DM-RS antenna port, thereby improving the reception performance of the DM-RS based DL data channel.

Meanwhile, in LTE, it is regulated that when a DL signal is transmitted in mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with large-scale properties except average gain. This means that physical channels and signals are transmitted in the same point. On the other hand, QCL type B is defined such that up to four QCL modes are configured for each UE by a higher-layer message to enable CoMP transmission such as DPS or JT and which QCL mode is used to receive a DL signal is dynamically configured through DCI.

DPS transmission in the case of QCL type B will now be described in more detail.

It is assumed that node #1 having $N_1$ antenna ports transmits CSI-RS resource #1 and node #2 having $N_2$ antenna ports transmits CSI-RS resource #2. In this case, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within a common overage of node #1 and node #2 by a higher-layer signal.

Then, the eNB may perform DPS by configuring, using DCI, QCL mode parameter set #1 for the UE during data (i.e. a PDSCH) transmission to the UE through node #1 and configuring QCL mode parameter set #2 for the UE during data transmission to the UE through node #2. If QCL mode parameter set #1 is configured for the UE through the DCI, the UE may assume that CSI-RS resource #1 is quasi co-located with a DM-RS and if QCL mode parameter set #2 is configured for the UE, the UE may assume that CSI-RS resource #2 is quasi co-located with the DM-RS.

An active antenna system (AAS) and three-dimensional beamforming will be described below.

In a legacy cellular system, an eNB reduces ICI and increases the throughput of UEs within a cell, e.g. SINRs, by mechanical tilting or electrical tilting, which will be described below in more detail.

Figure 12:
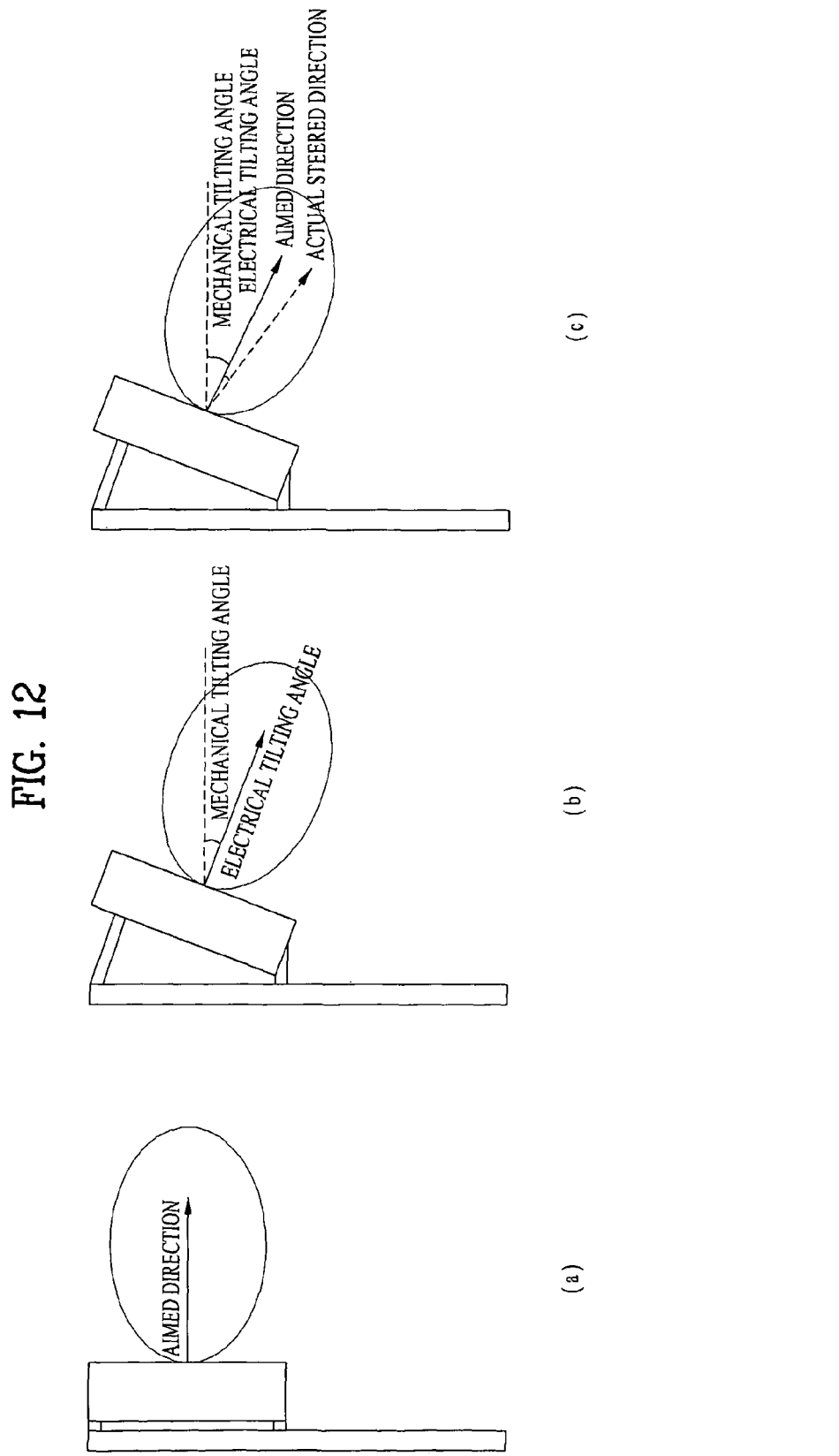
FIG. 12 is a diagram illustrating an antenna tilting scheme.

FIG. 12 is a diagram illustrating an antenna tilting scheme. Specifically, FIG. 12(*a*) illustrates an antenna structure to which antenna tilting is not applied, FIG. 12(*b*) illustrates an antenna structure to which mechanical tilting is applied, and FIG. 12(*c*) illustrates an antenna structure to which both mechanical tilting and electrical titling are applied.

In comparison with FIG. 12(*a*), mechanical tilting of FIG. 12(*b*) causes a beam direction to be fixed at initial antenna installation. Electrical tilting of FIG. 12(*c*) allows only very restrictive vertical beamforming due to cell-fixed tilting, despite the advantage of changing a tilting angle through an internal phase shift module.

Figure 13:
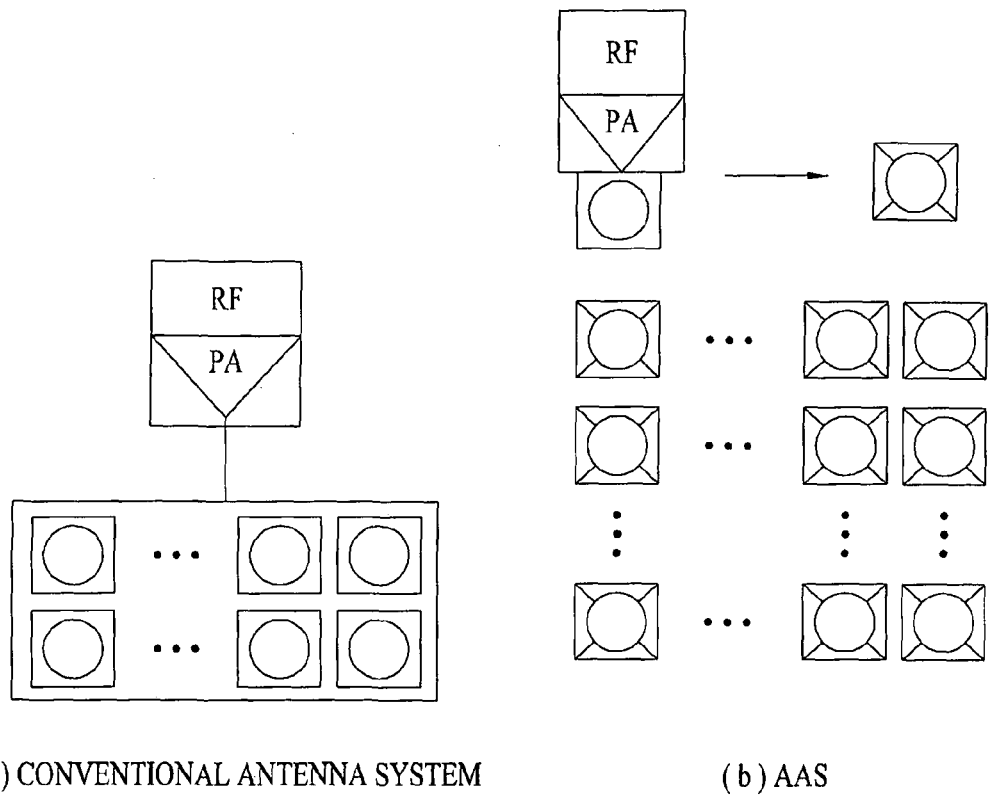
FIG. 13 is a diagram comparing a conventional antenna system with an active antenna system (AAS).

FIG. 13 is a diagram comparing a conventional antenna system with an AAS. Specifically, FIG. 13(*a*) illustrates the antenna system of the related art and FIG. 13(*b*) illustrates the AAS.

Referring to FIG. 13, as compared to the conventional antenna system, the AAS includes a plurality of antenna modules, each of which includes a radio frequency (RF) module such as a power amplifier (PA), that is, an active device so that the AAS can control the power and phase of each antenna module.

Generally, a linear array antenna, i.e. a one-dimensional array antenna, such as a ULA has been considered as a MIMO antenna structure. In a one-dimensional array structure, a beam that may be formed by beamforming exists on a two-dimensional (2D) plane. The same applies to a passive antenna system (PAS) based MIMO structure of a legacy eNB. Although a PAS based eNB has vertical antennas and horizontal antennas, the vertical antennas may not form a beam in a vertical direction and may allow only the afore-described mechanical tilting because the vertical antennas are in one RF module.

However, as the antenna structure of an eNB has evolved into an AAS, RF modules are independently configured even in vertical antennas. Consequently, vertical beamforming as well as horizontal beamforming is possible. This is called vertical beamforming or elevation beamforming.

The vertical beamforming may also be referred to as three-dimensional (3D) beamforming in that beams that can be generated according to the vertical beamforming may be formed in a 3D space in the vertical and horizontal directions. That is, the evolution of a one-dimensional array antenna structure to a 2D array antenna structure enables 3D beamforming. 3D beamforming is not necessarily formed when an antenna array is planar. Rather, 3D beamforming may be formed even in a ring-shaped 3D array structure. A feature of 3D beamforming lies in that a MIMO process is implemented on a 3D space in view of various antenna layouts other than existing one-dimensional antenna structures.

Figure 14:
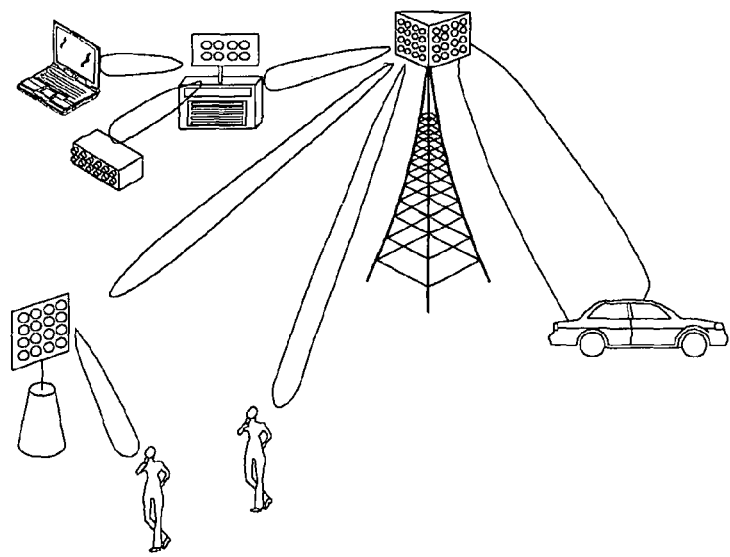
FIG. 14 illustrates exemplary UE-specific beamforming based on an AAS.

FIG. 14 illustrates exemplary UE-specific beamforming based on an AAS. Referring to FIG. 14, even though a UE moves forward or backward from an eNB as well as to the left and right of the eNB, a beam may be formed toward the UE by 3D beamforming. Therefore, a higher degree of freedom is given to UE-specific beamforming.

Further, as transmission environments using an AAS based 2D array antenna structure, not only an outdoor-to-outdoor environment where an outdoor eNB transmits a signal to an outdoor UE but also an outdoor-to-indoor (O2I) environment where an outdoor eNB transmits a signal to an indoor UE and an indoor hotspot where an indoor eNB transmits a signal to an indoor UE may be considered.

Figure 15:
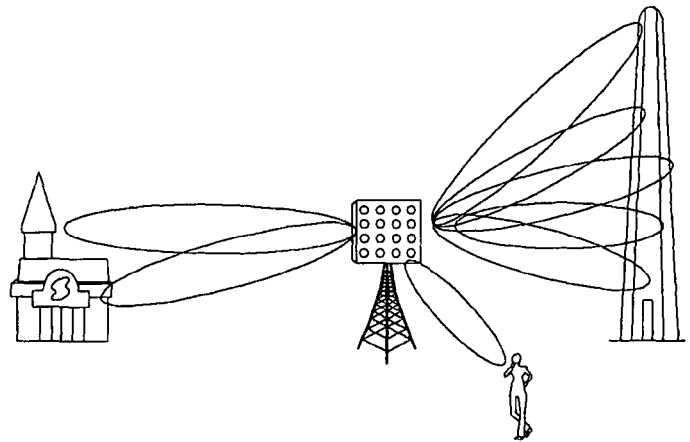
FIG. 15 illustrates an AAS based 3D beam transmission scenario.

FIG. 15 illustrates an AAS based 3D beam transmission scenario.

Referring to FIG. 15, an eNB needs to consider vertical beam steering based on various UE heights in relation to building heights as well as UE-specific horizontal beam steering in a real cell environment in which a plurality of buildings is present in a cell. Considering this cell environment, significantly different channel characteristics from those of an existing wireless channel environment, for example, shadowing/pathloss changes according to different heights, fading characteristic variations, etc. need to be reflected.

In other words, 3D beamforming is an evolution of beamforming in the horizontal direction only, based on an existing linear one-dimensional antenna array structure. 3D beamforming refers to a MIMO processing scheme performed by extending horizontal beamforming to elevation beamforming or vertical beamforming or combining horizontal beamforming with elevation beamforming or vertical beamforming, based on a multi-dimensional array antenna structure such as a planar array or on a massive antenna array.

The massive antenna array may have at least one of the following characteristics. That is, i) the massive antenna array is located on a 2D plane or a 3D space, ii) the massive antenna array includes 8 or more logical or physical antennas (the logical antennas may be expressed as antenna ports), and iii) each antenna of the massive antenna array may be configured by an AAS. However, the definition of the massive antenna array is not limited thereto.

In a conventional MIMO system, PMI feedback for an entire antenna array of an eNB has been performed for closed-loop MIMO transmission. This may be understood that a UE feeds back a beam direction best preferred thereby among multiple beam directions capable of being generated by all antennas of the eNB expressed in the form of a PMI codebook.

Table 6 listed below shows comparison between beams transmitted through 16 antennas in the form of 4 rows by 4 columns and beams transmitted by 64 antennas in the form of 8 rows by 8 columns. Referring to Table 6, as the number of antennas of the eNB increases, the width of beams generated by eNB is reduced and the shape of the beams becomes sharp, thereby resulting in increase of beam gain. During closed-loop MIMO transmission, as a beam becomes sharper, a PMI at a timing measured by the UE and a PMI at a timing actually transmitted by an eNB are inconsistent, despite slight change in a channel. As a result, performance is significantly degraded. In other words, performance sensitivity for feedback may greatly increase.

TABLE 6

|  | 16 Tx Case | 64 Tx Case |
| --- | --- | --- |
| Design frequency (GHz) | 2 | 2 |
| Array config | 4 × 4 | 8 × 8 |
| Antenna dimension (Half Length) | 30 mm | 30 mm |
| elements distance | dx: 75 mm<br>dy: 75 mm | dx: 75 mm<br>dy: 75 mm |
| Fractional bandwidth (MHz) | 1.89 GHz~2.15 GHz<br>(260 Mz) | 1.89 GHz~2.15 GHz<br>(260 Mz) |
| VSWR | Max 2:1 | Max 2:1 |
| Radiation pattern shape | Directional | Directional |
| Max. gain (dB) | 19.52 | 25.54 |
| Radiation efficiency (%) | 100% | 100% |
| HPBW_E-plane (°) | 26 | 12 |
| HPBW_H-plane (°) | 24 | 12 |

Accordingly, the present invention proposes a method in which an eNB adaptively controls a beam shape (e.g. beamwidth, beam gain, beam direction, etc.) according to a channel situation with a UE in a system including a plurality of Tx antennas, and a feedback method of a UE for supporting the same.

First, when the eNB transmits a signal to the UE, it is proposed that the eNB adaptively select an effective Tx antenna port set suitable for a channel situation with each UE.

The effective Tx antenna port set is a subset of all Tx antenna port sets of the eNB, for performing data transmission to the UE and may be limited to a part of all antennas used for data transmission according to a channel situation with a UE.

Figure 16:
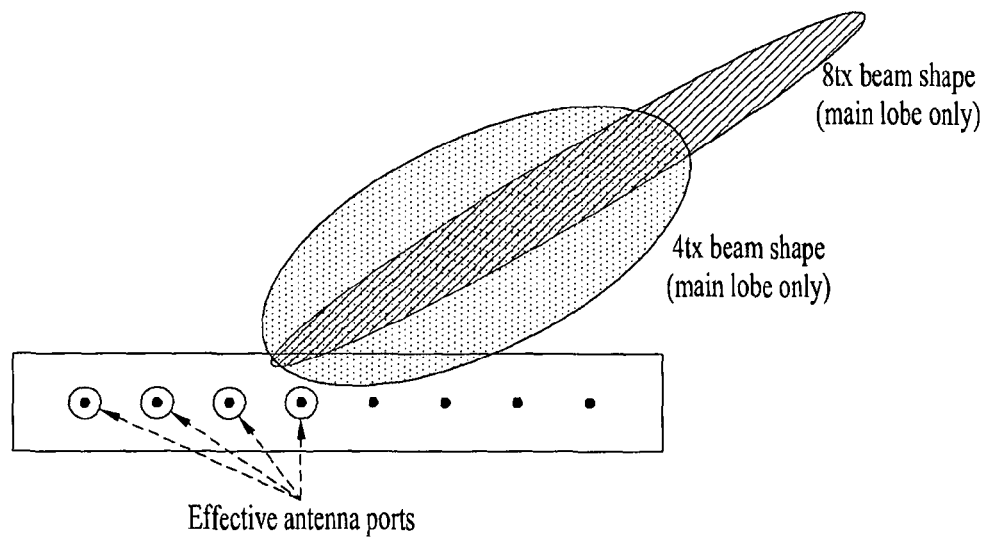
FIG. 16 illustrates exemplary selection of an effective antenna port set among all antenna ports.

FIG. 16 illustrates exemplary selection of an effective antenna port set among all antenna ports.

Referring to FIG. 16, in the case of an 8Tx ULA, since beams are relatively sharp, considerable gain can be obtained in an environment in which a UE moves a little, an ambient environment is static, and a line of sight (LoS) is ensured. However, if the UE moves a lot or there are many factors generating a dynamic change of a channel in the vicinity of the UE, a retransmission probability caused by a packet error increases relative to significant feedback overhead and beamforming gain may greatly decrease in a non-LoS (NLoS) environment even though retransmission does not occur.

Conventionally, an open-loop MIMO technique has been applied to the UE in such an environment. However, since the open-loop MIMO technique cannot obtain beam gain, performance degradation increases relative to closed-loop MIMO as the number of antennas increases. Therefore, the present invention proposes a method for transmitting a beam formed by extending beamwidth even though beam gain decreases, as illustrated in FIG. 16, when it is expected that the eNB cannot obtain beamforming gain of a given level in a channel environment of the UE. That is, an example of decreasing the number of effective antenna ports and the size of an effective antenna array is illustrated in FIG. 16 in order to extend beamwidth.

Effective antenna ports, that is, an effective antenna array, are not always configured to be adjacent as in FIG. 16.

Figure 17:
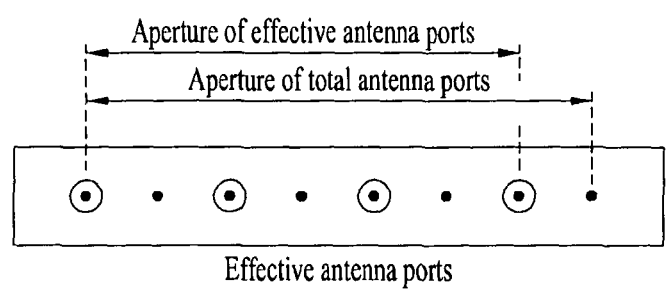
FIG. 17 illustrates another exemplary selection of an effective antenna port set among all antenna ports.

FIG. 17 illustrates another exemplary selection of an effective antenna port set among all antenna ports. If it is assumed that a UE can perform spatial multiplexing of rank 2 or more due to an NLoS environment and simultaneously a high SINR because the UE is adjacent to an NB, the number of effective antennas can be decreased while the size of an entire effective array is not greatly decreased in consideration of performance relative to feedback overhead, as illustrated in FIG. 17.

As a similar embodiment, when two adjacent antennas are jointly mapped to one logical antenna, the number of effective antennas (or the number of logical antennas) can be reduced to half the number of all antennas while the size of an entire effective antenna array is similarly maintained.

When the present invention is applied to a 2D antenna array, although an effective antenna port set of all antennas may be simultaneously determined, the number of effective antennas and/or the size of an effective antenna array may be controlled with respect to each of a vertical region and a horizontal region. In other words, an effective antenna port set of the vertical region and an effective antenna port set of the horizontal region may be separately determined. Here, the range of physical signals/channels to which the effective Tx antenna port set of the present invention is applied may be limited to UE-specific signals/channels such as a DM-RS (UE-specific RS) and a PDSCH in an LTE system.

According to the present invention, in forming a UE-specific beam, a packet error probability can be lowered by transmitting a beam, the sharpness of which is reduced, to a UE that is expected to have a severe channel error or a UE to which data retransmission is needed (fallback mode) and feedback overhead can be reduced or feedback accuracy can be increased with respect to a UE in an environment in which a channel error is expected to be serious and a UE having a low SINR.

Meanwhile, according to the present invention, a channel situation of the UE may be divided into three or more categories to determine a transmission mode. For example, the transmission mode may be defined below using an effective antenna port set, that is, a partial antenna array.

Category 1 (low mobility, LoS, and static environment)
→Dedicated beamforming with all antennas Category 2 (mid mobility, weak LoS, and non-static environment)→Dedicated beamforming with a subset of antennas Category 3 (high mobility, NLoS, and dynamic environment)→open-loop beamforming Meanwhile, during beamforming using a partial antenna array, an effective Tx antenna port set may be determined by at least of channel characteristics of an eNB and a UE, for example, mobility of the UE (speed, rotation, acceleration, etc.), a Doppler level of a channel (Doppler spread, maximum Doppler value, etc.), a scattering environment around the UE (number and distribution of scatterers, mobility of scatterers, etc.), characteristic parameters of a channel matrix (rank, Eigen value, condition number, etc.), an LoS/NLoS factor (LoS gain-to NLoS gain ratio, number of NLoS clusters, etc.), and an SINR. Some of the above information may be obtained from a radio environment database according to location of the UE in eNB coverage or may be directly measured using UL signal by the eNB. Alternatively, the UE may provide some of the above information.

Alternatively, during beamforming using the partial antenna array, the UE may provide the eNB with at least one of mobility of the UE (speed, rotation, acceleration, etc.), a Doppler level of a channel (Doppler spread, maximum Doppler value, etc.), a scattering environment around the UE (number and distribution of scatterers, mobility of scatterers, etc.), characteristic parameters of a channel matrix (rank, Eigen value, condition number, etc.), an LoS/NLoS factor (LoS gain-to NLoS gain ratio, number of NLoS clusters, etc.), and an SINR. To this end, the UE may configure feedback information using various sensors such as a location sensor, an acceleration sensor, etc.

Now, a description will be given of a beamforming method using a partial antenna array based on feedback information of the UE.

First, the UE may feed back a preferred effective Tx antenna port set to the eNB. To this end, the UE judges which Tx antenna ports among all Tx antenna ports of the eNB are to be selected as an effective antenna port set and feeds back information about the selected effective antenna port set. Similarly, the UE selects an optimal effective antenna set using available information among UE mobility, a Doppler level, a scattering environment around the UE, LoS/NLoS, an SINR, etc.

The information fed back by the UE may be variously configured as follows.

a) The information about the effective Tx antenna port set may be configured by at least one of a set of antenna port indexes (or an index of an antenna port set), a pilot pattern index, and the number of antenna ports.

For example, if the information about the effective Tx antenna port set is configured by the number of antenna ports and the index of an antenna port set and if the eNB includes a total of 8 Tx antennas, the UE selects the preferred number of antennas from among 2 Tx, 4 Tx, and 8 Tx antennas, selects an index corresponding to the number of antennas from Table 7 shown below, and feeds back the selected index corresponding to the number of antennas together with the number of antennas.

TABLE 7

| Index | 2Tx | 4Tx |
|---|---|---|
| 0 | Port {0, 1} | Port {0, 1, 2, 3} |
| 1 | Port {0, 7} | Port {0, 2, 4, 6} |

Hereinafter, a beamforming scheme using a partial antenna array is applied to each of vertical beamforming and horizontal beamforming in a 3D beamforming scheme. In the 3D beamforming scheme, as the number of antennas increases, pilot and feedback overhead increases and it is difficult to cover, using a single pilot pattern, pilot signals transmitted through all eNB antennas. To solve such problems, an eNB may transmit pilot signals using a plurality of pilot patterns to a UE.

Figure 18:
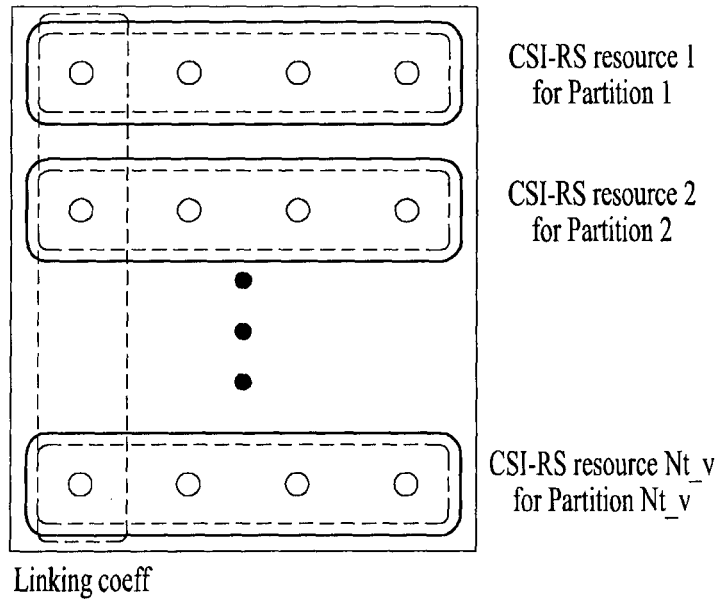
FIGS. 18 and 19 illustrate exemplary pilot transmission using a plurality of pilot patterns.
Figure 19:
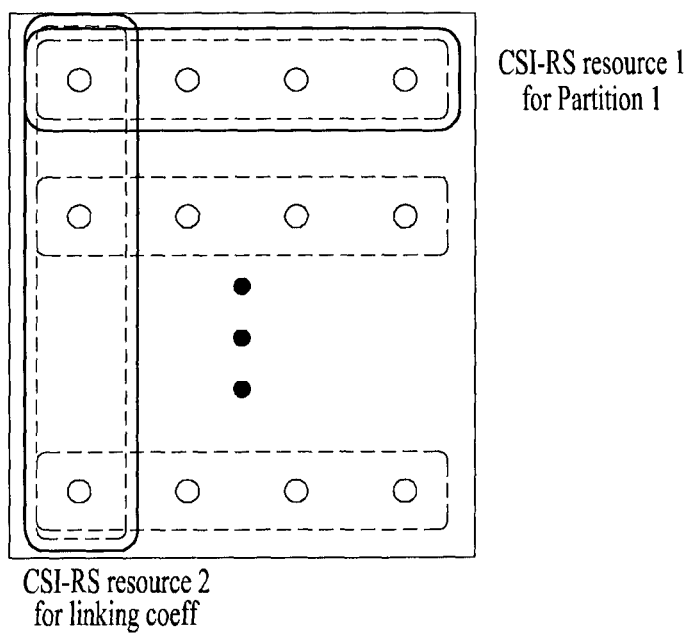

FIGS. 18 and 19 illustrate exemplary pilot transmission using a plurality of pilot patterns. Particularly, FIG. 18 illustrates exemplary pilot patterns configured in a horizontal direction, in which antennas are grouped in the horizontal direction and one CSI-RS resource is allocated to each antenna group. In this case, a precoder associated with each pilot pattern (i.e. a CSI-RS resource) corresponds to a precoder performing horizontal beamforming. A precoder linking each pilot pattern, more specifically, a set of coefficients indicating the difference in phase and size between the pilot patterns, corresponds to a precoder performing vertical beamforming. It is apparent that the antennas may be grouped in a vertical direction and the pilot patterns may be allocated to each antenna group.

FIG. 19 illustrates exemplary pilot patterns configured in both a horizontal direction and a vertical direction in which a precoder of the vertical direction is configured using pilot patterns other than a set of coefficients indicating the difference in phase and size between pilot patterns.

In this case, the following is proposed in order to perform beamforming using an independent partial antenna array with respect to each of the horizontal direction and vertical direction.

A) After receiving a plurality of QCL pilot patterns, a UE feeds back, to an eNB, (1) the number and/or indexes of antenna ports to be included in preferred QCL pilot patterns and (2) the number and/or indexes of coefficients for linking preferred QCL pilot patterns. The QCL pilot patterns refer to a set of pilot patterns transmitted from the same transmission point and may be defined as time-/frequency-synchronized pilot patterns in terms of a receiver. Characteristically, the QCL pilot patterns may include the same number of antenna ports. The pilot patterns may be NZP CSI-RS resources or CSI-RS processes.

The above information (1), i.e. the number and/or indexes of antenna ports to be included in preferred QCL pilot patterns, may be independent information of the respective QCL patterns but may be expressed as one representative value capable of being commonly applied to all QCL pilot patterns.

In the above information (2), i.e. the number and/or indexes of coefficients for linking preferred QCL pilot patterns, the coefficients for linking QCL pilot patterns may be coefficient values indicating the difference in phase and/or size between specific antenna ports of the pilot patterns. The UE may gather corresponding coefficient values and feed back the coefficient values to the eNB.

For example, in FIG. 18, the UE may calculate the difference in size and phase between first antenna ports of respective CSI-RS resources and feed back the calculated difference values to the eNB. These values may be used for vertical beamforming in terms of the eNB. To use a whole vertical antenna array, as many coefficient values (hereinafter, linking coefficients) as the total number (N) of QCL pilot patterns are needed. However, since the phase and/or size difference value can be measured based on a specific pilot pattern and thus information about the reference pilot pattern may not be needed, (N−1) coefficient values may be required. For example, when two pilot patterns are transmitted, only one linking coefficient of the second pilot pattern with respect to the first pilot pattern may be required. This will be described in more detail.

Figure 20:
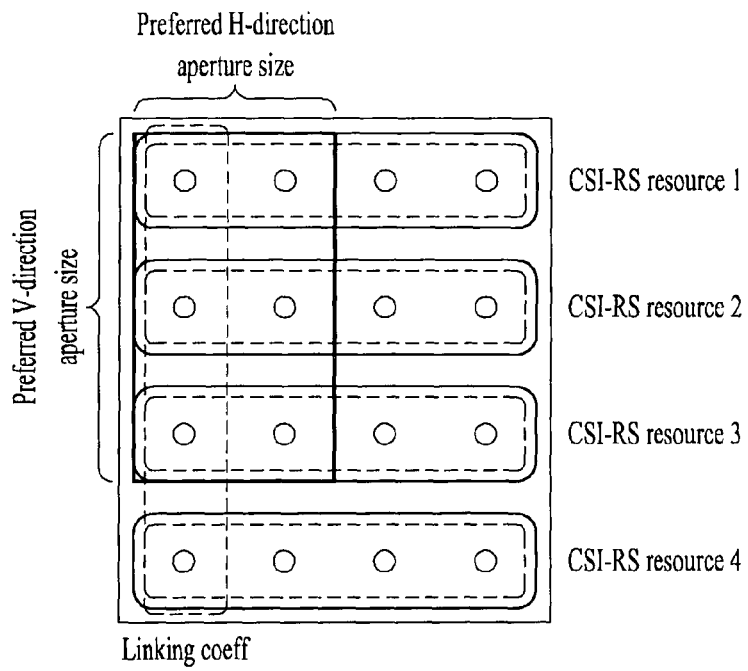
FIG. 20 illustrates exemplary beamforming using a partial antenna array according to an embodiment of the present invention.

FIG. 20 illustrates exemplary beamforming using a partial antenna array according to an embodiment of the present invention. Particularly, a 2D antenna array environment in which 16 (=4×4) antenna ports are transmitted is assumed in FIG. 20.

Referring to FIG. 20, an eNB configures and transmits four QCL CSI-RS resources, that is, CSI-RS resource 1 to CSI-RS resource 4 to a UE. If the UE prefers beamwidth corresponding to two antenna ports in a horizontal direction and beamwidth corresponding to three antenna ports in a vertical direction, the UE may feed back the following information. Here, a system for feeding back up to (N−1) linking coefficients is assumed.

Preferred number of antenna ports for each QCL CSI-RS resource=2
  Preferred number of linking coefficients=2

In the above example, although information about only the number of antenna ports and the number of linking coefficients is expressed, information about antenna indexes may also be fed back so that a preferred antenna subarray is not concentrated to a specific part. For example, if the UE prefers antenna ports #2 and #3 among antenna ports #0 to #3 included in a CSI-RS pattern, the indexes of the preferred antenna ports may be expressed in a set form as shown below and or a start index of the preferred antenna ports may be fed back together with the number of preferred antenna ports.

Preferred antenna port index set: {#2, #3}
  Preferred antenna port start index (#2)+number of antenna ports (2)

The index information is applicable to the linking coefficients in the same form.

Along with the proposed information, the UE may feed back the linking coefficients and precoder information such as a preferred PMI, based on the feedback information. That is, the UE may transmit a PMI selected from a 2Tx PMI codebook rather than 4Tx PMI codebook with respect to each CSI-RS resource and feed back only linking coefficients for linking three among four CSI-RS resources. Other CSI feedback information such as CQI and RI may be calculated based on the above feedback information. The transmission periods of the proposed information and the CSI feedback information may differ.

If pilot patterns are applied to both the horizontal direction and the vertical direction as illustrated in FIG. 19, the UE may feed back the preferred number of antenna ports of each pilot pattern and index information about the preferred antenna ports and perform beamforming using an independent partial antenna array with respect to the horizontal and vertical directions.

If the feedback information proposed in the present invention is applied to a wideband system, a separate feedback information set with respect to each frequency region divided according to, for example, a subband, sub-carrier, resource block, etc. may be fed back. Alternatively, the feedback information only for a specific frequency region selected by the UE or designated by the eNB may be transmitted. The frequency region may be configured by one or more continuous frequency regions or discontinuous frequency regions.

a) Partial antenna array based beamforming applied in a 3D beamforming environment is referred to as beamwidth adaptation (BA) beamforming and BA beamforming has the following characteristics.

Figure 21:
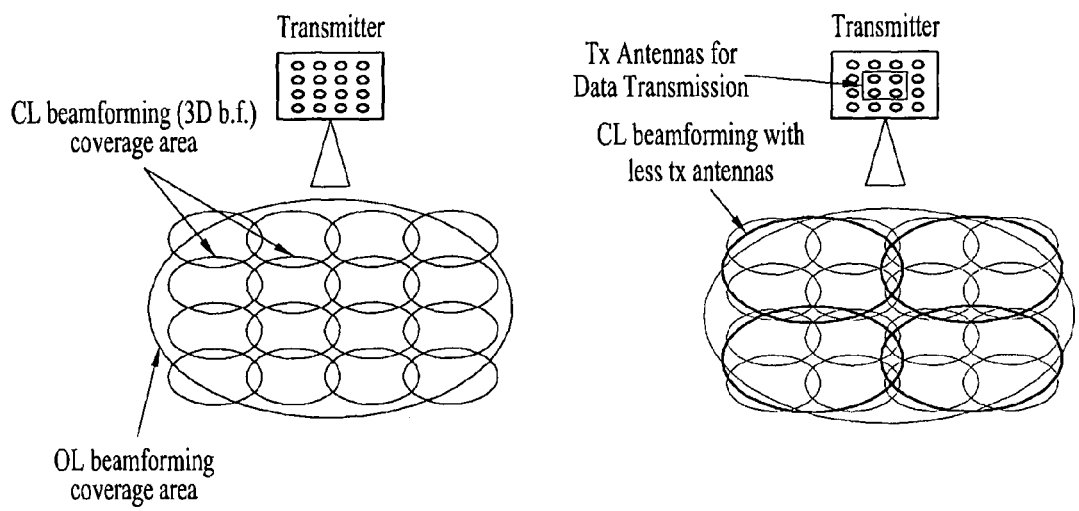
FIG. 21 is a diagram illustrating comparison between beam coverage of a conventional MIMO transmission scheme and beam coverage of a BA beamforming scheme.

A BA beamforming scheme is a technique for adapting the width of transmission beams by adjusting the number of antennas participating in data transmission according to mobile speed of the UE. FIG. 21 is a diagram illustrating comparison between beam coverage of a conventional MIMO transmission scheme and beam coverage of a BA beamforming scheme. Specifically, the left drawing of FIG. 21 illustrates the conventional MIMO transmission scheme and the right drawing of FIG. 21 illustrates the BA beamforming scheme.

Referring to the left drawing of FIG. 21, when a UE moves at a medium speed in a 4×4 antenna array, beamwidth transmitted by the 4×4 antenna array may be extremely narrow to ensure channel accuracy and beamwidth in an open-loop scheme may be considerably wide because a whole cell is covered. If only a central 2×2 antenna array participates in transmission as illustrated in the right drawing of FIG. 21, beams which can obtain beam gain in spite of relatively wide beamwidth may be generated. That is, beam gain of a level which is lower than closed-loop beamforming but higher than open-loop beamforming can be obtained by extension of beamwidth by reducing the number of antennas participating in transmission for the UE according to mobile speed of the UE.

b) BA beamforming is a technique for adapting beamwidth according to mobility of the UE, whereas a method for performing beamforming only in a vertical or horizontal direction and performing open-loop precoding in the other direction according to a moving direction of the UE may be considered. This method is referred to as a dimension adaptation (DA) beamforming scheme because 2D beamforming can be performed in a 3D beamforming environment.

Figure 22:
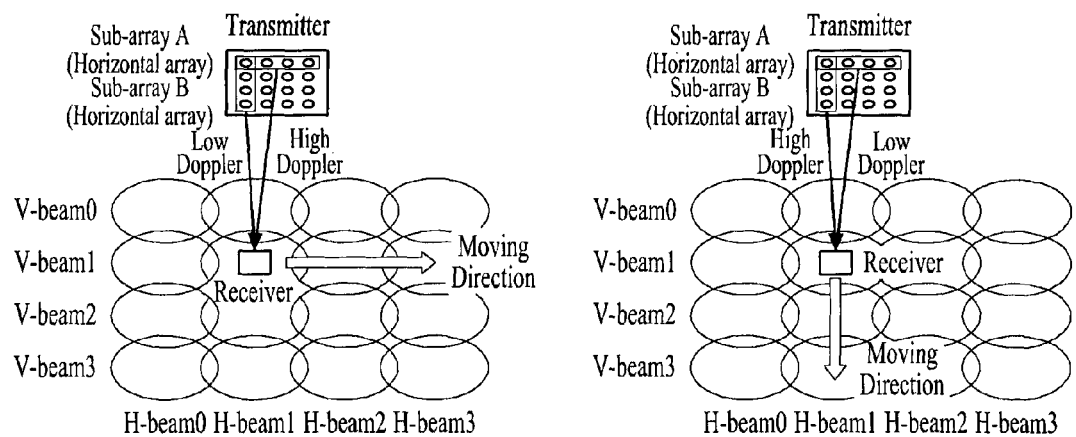
FIG. 22 is a diagram illustrating the concept of a DA beamforming scheme.

The DA beamforming scheme is a beamforming scheme in which an open-loop scheme is applied to a quick motion direction of the UE, that is, a direction showing high Doppler effect, of the vertical direction and horizontal direction of the UE and a closed-loop scheme is applied to the other direction. FIG. 22 is a diagram illustrating the concept of a DA beamforming scheme. Specifically, the left drawing of FIG. 22 illustrates the case in which a UE moves in a horizontal direction and the right drawing of FIG. 22 illustrates the case in which a UE moves in a vertical direction.

Figure 23:
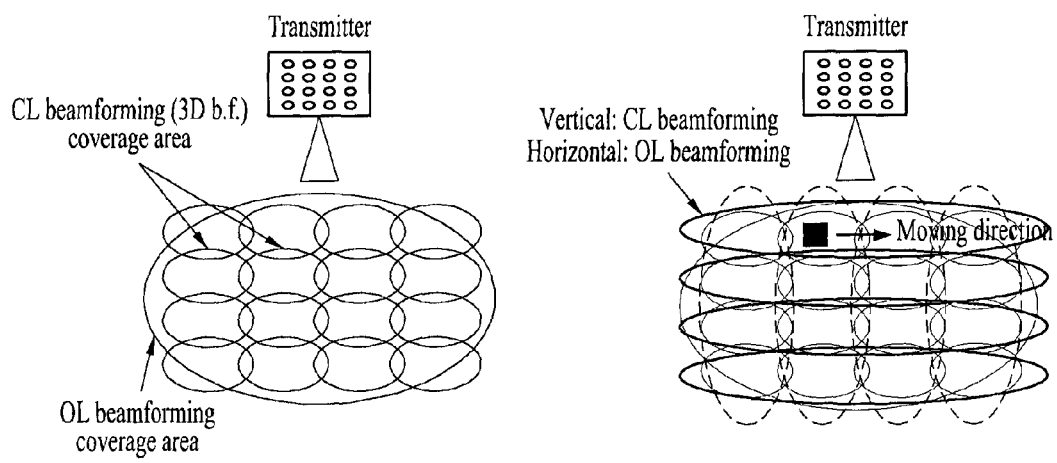
FIG. 23 is a diagram illustrating the characteristics of a DA beamforming scheme.

FIG. 23 is a diagram illustrating the characteristics of a DA beamforming scheme.

Figure 24:
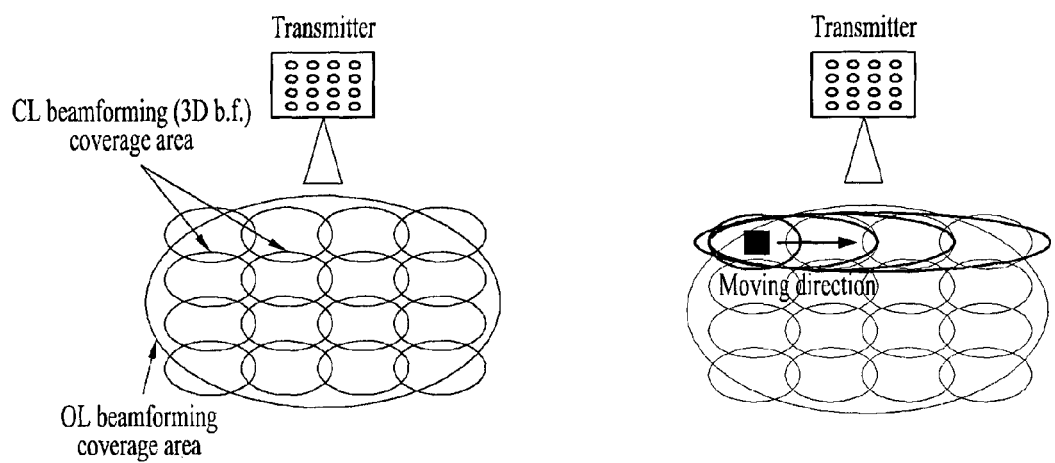
FIG. 24 is a diagram illustrating the concept of a DBA beamforming scheme.

If the DA beamforming scheme is used, beam gain can be obtained in a direction showing low Doppler effect and cannot be obtained in a direction showing high Doppler effect. Therefore, beams of narrow width are formed only in one of a horizontal direction and a vertical direction as illustrated in FIG. 23. Therefore, beam gain of a prescribed level can be assigned a UE moving in a specific direction.

c) A dimension and beamwidth adaptation (DBA) beamforming scheme combining BA beamforming with DA beamforming may be considered. FIG. 24 is a diagram illustrating the concept of a DBA beamforming scheme.

The DBA beamforming scheme is a technique combining the DA beamforming scheme with the BA beamforming scheme. Referring to FIG. 24, when a UE moves in a vertical or horizontal direction while the DBA beamforming scheme is applied, closed-loop beamforming is performed in a direction showing low Doppler effect, that is, in a direction orthogonal to a UE moving direction, and beamwidth is adapted by adjusting the number of antennas participating in transmission according to speed of the UE in a direction showing Doppler effect of a prescribed level.

In summary, DA beamforming is effective when the UE moves at a high speed in a specific direction based on an eNB and BA beamforming is effective in an environment in which the UE moves at a low or medium speed. DBA beamforming is effective when the UE moves a low or medium speed in a specific direction.

TABLE 8

| | |
|---|---|
| Dimension Adaptation (DA) Beamforming | When UE moves at high speed in vertical or horizontal direction based on eNB |
| Beamwidth Adaptation (BA) Beamforming | When UE moves at low or medium speed |
| DBA Beamforming (DA + BA) | When UE moves at low or medium speed in vertical or horizontal direction based on eNB |

To support DBA beamforming, the UE needs to feed back not only information about an effective Tx antenna port preferred thereby but also information indicating whether closed-loop transmission or open-loop transmission is applied to each of the row and column of an antenna array, as described above. That is, feedback information should be configured to include the following information 1 and information 2.

Information 1: information indicating whether closed-loop beamforming or open-loop beamforming is applied to vertical region/horizontal region Information 2: information about a set of effective Tx antenna ports for a region in which closed-loop beamforming is preferred Meanwhile, if a pilot signal for a 2D array is transmitted using a plurality of pilot patterns in which QCL can be assumed as illustrated in FIG. 18, Information 1 may be configured by information about a channel on which closed-loop transmission is preferred out of an (average) MIMO channel including antenna ports belonging to the pilot patterns and a MIMO channel including coefficients for linking the pilot patterns. Namely, the UE needs to configure feedback information including the following information 1 and information 2 after receiving the pilot patterns in which QCL can be assumed.

Information 1: information indicating whether closed-loop beamforming or open-loop beamforming is applied to a first MIMO channel including antenna ports defining respective pilot patterns and a second MIMO channel including coefficients for linking the pilot patterns.

Information 2: information about a set of effective Tx antenna ports for channel(s) on which closed-loop transmission is preferred In Information 1, the first MIMO channel may be an average of MIMO channels estimated by the respective pilot patterns and determination as to whether closed-loop/open-loop beamforming is applied to the first MIMO channel may be overall determination as to whether to apply closed-loop/open-loop beamforming to each pilot pattern.

In addition, if a pilot signal for a 2D array is transmitted using pilot patterns in which QCL can be assumed as illustrated in FIG. 19, the above Information 1 may be configured by information about a channel on which closed-loop transmission is preferred out of a MIMO channel including antenna ports belonging to first pilot patterns and a MIMO channel including antenna ports belonging to second pilot patterns. Namely, the UE feeds back the following information after receiving the pilot patterns in which QCL can be assumed.

Information 1: information indicating whether closed-loop beamforming or open-loop beamforming is applied to a MIMO channel including pilot patterns Information 2: number and/or indexes of antenna ports for channel(s) on which closed-loop transmission is preferred While the above-proposed Information 1 and Information 2 may be expressed as distinguishable information fields as in the above embodiments, Information 1 and Information 2 may be expressed as one information field as in a proposed scheme described below. That is, the UE feeds back information about an effective Tx antenna port set for a vertical region/horizontal region to the eNB. The information about the effective Tx antenna port set includes a null set. If the effective Tx antenna port set is a null set, this means that open-loop transmission is preferred with respect to a corresponding region.

For example, a vertical region and a horizontal region correspond to the first MIMO channel including antenna ports belonging to pilot patterns and the second MIMO channel including coefficients for linking the pilot patterns in FIG. 18. Alternatively, the vertical region and the horizontal region may correspond to MIMO channels including pilot patterns in FIG. 19. The UE feeds back only information about the preferred number and/or indexes of antenna ports for channels corresponding to the vertical region and the horizontal region. However, if open-loop transmission is preferred in a corresponding region, the UE feeds back 0 as the preferred number of antenna ports and a null set as an antenna index set. That is, as relative mobility becomes severe and Doppler effect is high, the UE preferably reduces the number of antenna ports in a corresponding region. Accordingly, the number of antenna ports is 0 when the UE moves at a high speed or Doppler effect is extremely high. The eNB performs open-loop transmission with respect to a corresponding region when the number of antenna ports preferred by the UE is 0.

The number of antenna ports of 0 and the antenna index set of the null set are purely exemplary and other numbers or codes for a corresponding operation may be regulated. For example, if Doppler effect is high in a corresponding region, the UE may feed back values other than a preset number or range.

Figure 25:
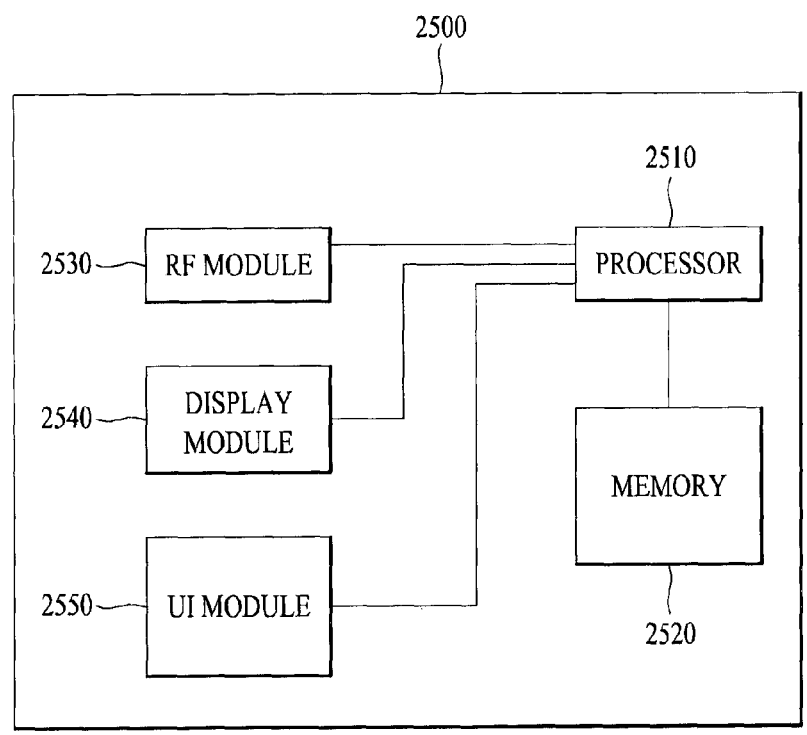
FIG. 25 is a block diagram of a communication apparatus according to an embodiment of the present invention.

FIG. 25 is a block diagram of a communication apparatus according to an embodiment of the present invention.

Referring to FIG. 25, a communication device 2500 includes a processor 2510, a memory 2520, a radio frequency (RF) module 2530, a display module 2540, and a user interface (UI) module 2550.

The communication device 2500, is illustrated for convenience of description and some modules may be omitted. The communication device 2500 may further include necessary modules. Some modules of the communication device 2500 may be further divided into sub-modules. The processor 2500 is configured to perform operations according to the embodiments of the present invention exemplarily described with reference to the drawings. Specifically, for a detailed description of operations of the processor 2500, reference may be made to the description described with reference to FIGS. 1 to 24.

The memory 2520 is connected to the processor 2510 and stores operating systems, applications, program code, data, and the like. The RF module 2530 is connected to the processor 2510 and performs a function of converting a baseband signal into a radio signal or converting a radio signal into a baseband signal. For this, the RF module 2530 performs analog conversion, amplification, filtering, and frequency upconversion or performs inverse processes thereof. The display module 2540 is connected to the processor 2510 and displays various types of information.

The display module 2540 may include, but is not limited to, a well-known element such as a liquid crystal display (LCD), a light emitting diode (LED), or an organic light emitting diode (OLED). The UI module 2550 is connected to the processor 2510 and may include a combination of well-known UIs such as a keypad and a touchscreen.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

In this document, a specific operation described as performed by an eNB may be performed by an upper node of the eNB. Namely, it is apparent that, in a network comprised of a plurality of network nodes including an eNB, various operations performed for communication with a UE may be performed by the eNB, or network nodes other than the eNB. The term eNB may be replaced with the terms fixed station, Node B, eNode B (eNB), access point, etc.

The embodiments according to the present invention can be implemented by various means, for example, hardware, firmware, software, or combinations thereof. In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

INDUSTRIAL APPLICABILITY

While the feedback reporting method and apparatus for massive antenna array based beamforming in a wireless communication system have been described in the context of a 3GPP LTE system, the present invention is also applicable to many other wireless communication systems in addition to 3GPP LTE. In addition, the method and apparatus may be applied to antenna structures other than a massive antenna structure.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

The invention claimed is:

1. A method for transmitting feedback information to a base station by a user equipment, for massive antenna array based beamforming in a wireless communication system, the method comprising:
    receiving information about a plurality of pilot patterns for a massive antenna array from the base station;
    estimating a plurality of channels corresponding to the plurality of pilot patterns by receiving a pilot signal based on the plurality of pilot patterns; and
    transmitting the feedback information for the plurality of channels to the base station,
    wherein the feedback information includes information about whether closed-loop beamforming or open-loop beamforming is applied to the plurality of channels and information about an effective antenna array for the plurality of channels,
    wherein the plurality of pilot patterns include first pilot patterns for defining one of a horizontal region or a vertical region of the massive antenna array and a second pilot pattern for linking the first pilot patterns,
    wherein, when a number of antenna ports included in the effective antenna array is 0, the open-loop beamforming is applied to an associated channel.

2. The method according to claim 1, wherein the channels include first channels corresponding to the first pilot patterns and a second channel corresponding to the second pilot pattern.

3. The method according to claim 1, wherein the information about the effective antenna array is information for adapting beamwidth of the associated channel.

4. The method according to claim 1, wherein the information about the effective antenna array includes information about the number of antenna ports included in the effective antenna array, and
    wherein the number of antenna ports is reduced as relative mobility of the user equipment increases.

5. A method for transmitting a signal to a user equipment by a base station, using massive antenna array based beamforming in a wireless communication system, the method comprising:
    transmitting information about a plurality of pilot patterns for a massive antenna array to the user equipment;
    transmitting a pilot signal based on the plurality of pilot patterns;
    receiving feedback information from the user equipment; and
    transmitting the signal to the user equipment through a plurality of channels corresponding to the plurality of pilot patterns,
    wherein the feedback information includes information about whether closed-loop beamforming or open-loop beamforming is applied to the plurality of channels and information about an effective antenna array for the plurality of channels,
    wherein the plurality of pilot patterns include first pilot patterns for defining one of a horizontal region or a vertical region of the massive antenna array and a second pilot pattern for linking the first pilot patterns,
    wherein, when a number of antenna ports included in the effective antenna array is 0, the open-loop beamforming is applied to an associated channel.

6. The method according to claim 5, wherein the channels include first channels corresponding to the first pilot patterns and a second channel corresponding to the second pilot pattern.

7. The method according to claim 5, wherein the information about the effective antenna array is information for adapting beamwidth of the associated channel.

8. The method according to claim 5, wherein the information about the effective antenna array includes information about the number of antenna ports included in the effective antenna array, and
   wherein the number of antenna ports is reduced as relative mobility of the user equipment increases.

* * * * *